United States Patent
Beetz et al.

(10) Patent No.: US 6,286,358 B1
(45) Date of Patent: Sep. 11, 2001

(54) PLIERS FOR CRIMPING WORK PIECES

(75) Inventors: Horst Beetz, Stadtallendorf; Kurt Battenfeld, Ebsdorfergrund-Wittelsberg, both of (DE)

(73) Assignee: WEZAG GmbH Werkzeugfabrik, Stadtallendorf (DE)

( * ) Notice: Subject to any disclaimer, the term of this patent is extended or adjusted under 35 U.S.C. 154(b) by 0 days.

(21) Appl. No.: 09/578,003

(22) Filed: May 24, 2000

(30) Foreign Application Priority Data

May 26, 1999 (DE) .............................. 199 24 086

(51) Int. Cl.$^7$ ....................................... B21D 7/06
(52) U.S. Cl. .................... 72/409.12; 72/409.16; 81/367; 81/372; 81/313
(58) Field of Search .................. 72/409.12, 409.16; 81/372, 375, 367, 377, 378, 313; 29/751

(56) References Cited

U.S. PATENT DOCUMENTS

| | | | | |
|---|---|---|---|---|
| 1,142,797 | * | 6/1915 | Burrell | 72/409.16 |
| 1,568,934 | * | 1/1926 | Tull | 81/378 |
| 2,519,973 | * | 8/1950 | Mead | 81/378 |
| 2,672,778 | * | 3/1954 | Jones | 81/377 |
| 2,814,222 | * | 11/1957 | Sanders | 81/378 |
| 2,842,996 | * | 7/1958 | Coslow | 81/378 |
| 3,324,702 | | 6/1967 | Malkin | 72/409 |
| 5,138,864 | * | 8/1992 | Tarpill | 72/409.12 |
| 5,153,984 | | 10/1992 | Beetz et al. | 29/751 |
| 5,187,968 | | 2/1993 | Beetz et al. | 29/751 |
| 5,280,716 | * | 1/1994 | Ryan | 72/409.07 |
| 5,913,933 | | 6/1999 | Beetz et al. | 72/409.16 |
| 6,026,671 | | 2/2000 | Battenfeld | 72/409.16 |
| 6,053,025 | | 4/2000 | Beetz et al. | 72/409.16 |
| 6,161,416 | * | 12/2000 | Wilhelm | 72/409.08 |

FOREIGN PATENT DOCUMENTS

| | | |
|---|---|---|
| AS 21 49 167 | 4/1973 | (DE) . |
| 25 55 071 C2 | 12/1975 | (DE) . |
| 25 59 656 B2 | 12/1975 | (DE) . |
| 26 02 491 | 1/1976 | (DE) . |
| 2519175 * | 11/1976 | (DE) .................. 81/378 |
| 34 11 397 C2 | 3/1984 | (DE) . |
| 197 09 639 A1 | 3/1997 | (DE) . |
| 297 17 314 U1 | 9/1997 | (DE) . |

* cited by examiner

Primary Examiner—Daniel C. Crane
(74) Attorney, Agent, or Firm—Thomas, Kayden, Horstemeyer & Risley

(57) ABSTRACT

Pliers for crimping work pieces include a first stationary handle (1) and a second movable handle (2). The first and second handle (1, 2) are designed and arranged to be movable with respect to one another and to be operable by one hand. A first pivot jaw (3) is connected to the first stationary handle (1) to form a stationary pliers portion. A second pivot jaw (4) is connected to the second movable handle (2). A common joint (5) pivotally connects the stationary pliers portion and the second pivot jaw (4). A first die (35) is arranged at the first pivot jaw (3). A second die (36) is arranged at the second pivot jaw (4). The first and second die (35, 36) together form a crimping die (8), and they are designed and arranged to contact one another in a closed position of the pliers in a separation plane (26). A locking mechanism (23) is operatively arranged between the stationary handle (1) and the second pivot jaw (4), and it is designed and arranged to attain a defined closed position of the first and second die (35, 36) in the separation plane (26). A toggle lever drive includes a plurality of supporting joints (10, 13, 17) and a pressure lever (16) operatively connecting the first and second handle (1, 2). The pressure lever (16) is supported by the plurality of supporting joints (10, 13, 17). The toggle lever drive is designed and arranged to change the effective length of the pressure lever (16) between a plurality of crimping steps to crimp the work piece in the plurality of crimping steps.

19 Claims, 7 Drawing Sheets

PLIERS FOR CRIMPING WORK PIECES

CROSS REFERENCE TO RELATED APPLICATIONS

This application claims the benefit of co-pending German Patent Application No. 199 24 086.8-15 entitled "Zange zum Verpressen von Fassungen, Rohren, Kabelschuhen und dgl." filed on May 26, 1999.

FIELD OF THE INVENTION

The present invention generally relates to pliers for crimping work pieces. More particularly, the present invention relates to pliers being operable with one hand and serving to apply great crimping forces.

BACKGROUND OF THE INVENTION

Pliers of this kind are also called crimping pliers or pressing pliers. Depending on the design of the work piece, especially in case of fittings, tubes and the like to be crimped, substantial pressing forces have to be applied onto the work piece. On the other hand, such work pieces may have comparatively great dimensions. Consequently, the crimping die being formed by two dies should have a great opening in the opened position of the pliers to be able to move the two dies over the work piece to be crimped in the opened position of the pliers. At the beginning of the closing movement of the pliers, there usually are no or no substantial pressing forces to be overcome. Contrarily, the pressing forces to be applied during the actual crimping movement of the work piece are substantial.

Pliers for crimping work pieces are known from German patent application DE 197 09 639 Al. The pliers include two handles being movable with respect to one another by one hand. Two pivot jaws are supported by a joint. One of the pivot jaws is connected to a stationary handle to form a stationary portion of the pliers. The other pivot jaw is pivotally connected to the stationary portion of the pliers by the joint. The pliers include separated dies forming a crimping die. A locking mechanism serves to reach a defined end position of the separated dies. The handles many first be reopened after the crimping process has been finished, after the end position has been reached and after the locking mechanism has released the handles. A pressure lever is arranged between the handles, and it is pivotable by the supporting joint. The pressure lever together with a section of the movable handle forms a toggle lever drive. The two dies and the corresponding pivot jaws are designed as one piece. The fixed connection of the combined pivot jaw/die to the stationary handle is disadvantageous. The maximum appliable crimping forces are limited. Additionally, the preciseness of the finished crimped work piece highly depends on the realizable process tolerances with which the elements of the pliers are produced and which are used to assemble the pliers. Consequently, in many cases it is necessary to rework the pliers. The known pliers include handles made of molded plastic. These handles provide great stability at reduced exactness. Since the material flows, disadvantageous displacements of, for example, prearrange bores cannot be prevented. The work piece is crimped in one crimping step.

Pliers for producing solderless connections between current conduits and corresponding connection elements by crimping the work pieces are known from German Auslegeschrift DE-AS 21 49 167. The pliers have a plate design, and they provide the corresponding advantages. The rather simple and exact production of the plates, for example by punching, is advantageous.

Linearly driven pliers having a plate design are also known from German patent 34 11 397 C2. The necessary forces for producing solderless connections are not substantial.

Clamping pliers are known from German patent DE 25 59 656 B2. The clamping pliers include two handles being movable with respect to one another. Two pivot jaws are rotatable about a common joint. One of the pivot jaws is connected to a fixed handle to form a fixed pliers portion. The other pivot jaw is pivotally connected to the fixed pliers portion by the joint. A pressure lever is arranged between the two handles. The pressure lever is pivotal about a supporting joint and, together with a section of the fixed handle, it forms a toggle lever drive. To adjust the effective length of the pressure lever despite the fixed connection of the pressure lever at both ends at the handles, at least one of the supporting joints includes an eccentric tappet including different angle positions to adjust the kinematics of the clamping pliers, especially of the end position during the closing movement of the pivot jaws.

German patent DE 25 55 071 C2 additionally shows the application of a locking mechanism being arranged between the pressure lever and the fixed handle to reproducibly attain the defined end position.

A crimping die including two handles being movable with respect to one another and two pivot jaws being pivotal about a common joint are known from US. Pat. No. 3,324, 702. One of the pivot jaws includes a die. The other pivot jaw is connected to the fixed handle to form a fixed pliers portion. The closing movement between the two handles is separated into a majority of crimping processes without a defined end position by a jack drive. Two pressure levers are arranged between the two handles to be pivotal about two additional supporting joints and by one common connecting joint. The jack drive or the ratchet drive includes a cam disk contacting a roller being supported at the connecting joint. In this way, a toggle lever drive is realized between the pivot jaws. Due to the fact that a jack drive is used, there is no locking mechanism for attaining a defined end position during the closing movement.

SUMMARY OF THE INVENTION

Briefly described, the present invention provides pliers for crimping work pieces. The pliers include a first stationary handle and a second movable handle. The first and second handle are designed and arranged to be movable with respect to one another and to be operable by one hand. A first pivot jaw is connected to the first stationary handle to form a stationary pliers portion. A second pivot jaw is connected to the second movable handle. A common joint pivotally connects the stationary pliers portion and the second pivot jaw. A first die is arranged at the first pivot jaw. A second die is arranged at the second pivot jaw. The first and second die together form a crimping die, and they are designed and arranged to contact one another in a closed position of the pliers in a separation plane. A locking mechanism is operatively arranged between the stationary handle and the second pivot jaw, and it is designed and arranged to attain a defined closed position of the first and second die in the separation plane. A toggle lever drive includes a plurality of supporting joints and a pressure lever operatively connecting the first and second handle. The pressure lever is supported by the plurality of supporting joints. The toggle lever drive is designed and arranged to change the effective length of the pressure lever between a plurality of crimping steps to crimp the work piece in the plurality of crimping steps.

The present invention is based on the concept of designing the pliers user friendly and for applying great crimping forces. It is desired to ensure that the pliers may be used and operated by one hand. This means that the handles need to be designed in a way that they may be grasped by the fingers of one hand of the user even in the opened position of the pliers. On the other hand, it is desired to be able to apply crimping forces of up to 3 to 5 tons and more onto the work piece. In the prior art, it is only possible to apply such great crimping forces with crimping tools including an electrical or hydraulic drive. The pliers according to the present invention are designed to attain these great crimping forces by realizing a plurality of crimping steps or stages. Due to a change of the effective length of the pressure lever between the crimping steps, there is the possibility of applying a few subsequent crimping steps. Realizing a few crimping steps means to provide at least two crimping steps up to approximately five crimping steps. Each crimping step is progressively dislocated with respect to the geometry of the toggle lever drive, especially with respect to its dead center, to attain the optimum ratio of transmission of the toggle lever drive during each crimping step, and to keep the necessary operating forces to be applied manually low. The pliers have a short structural length and a comparatively little weight. The pliers are still operable by one hand of the user. This means that the handles have a maximum opened position in which they include portions being spaced apart by less than approximately 110 mm.

The locking mechanism is located between the fixed handle and the pivot jaw being pivotal about the joint. The arrangement of the locking mechanism in the pliers is of substantial importance. The jack of the locking mechanism is resiliently movable but stationary. The jack may be arranged at the fixed handle, the locking mechanism preferably including a tooth segment including a low number of teeth having a comparatively pitch. That tooth segment is arranged at the pivot jaw, or at least it is connected thereto. With this arrangement, the pliers are adjustable such that the end position is safely attained in the last crimping step, and that an especially great crimping pressure is reproducibly applied before the pliers may be reopened, for example by a spring.

The change of the effective length of the pressure lever between the crimping stages may be designed to be automatically adjustable. The effective length of the pressure lever is changed from what it is in one crimping step to a different value in the following crimping step. This means that the effective length of the pressure lever is less in the first crimping step from what it is in the second crimping step and so forth. There are a number of possibilities to one with skill in the art to realize such a change of the effective length of the pressure lever. For example, it is possible to tension a spring during the closing stroke of the first crimping step, the spring being released during the loosening stroke of the second crimping step to realize a drive for the automatic adjustment. The effective length of the pressure lever may, for example, be change by the pressure lever having a three-part design and including a rotatable centerpiece having a right-handed/left-handed thread. Another exemplary possibility of changing the effective length of the pressure lever is to provide the supporting joints of the pressure lever with a radially changing cam surface, and to turn the cam surface between the crimping steps.

Nevertheless, it is also possible to manually change the effective length of the pressure lever between the crimping steps. In this case, the effective length of the pressure lever is changed by a manual actuation. This change also takes place during the loosening stroke or the opening stroke of the handles. The necessary adjustment for changing the effective length of the pressure lever always takes place during the crimping steps in the opening stroke or in the loosening stroke of the handles.

A jack drive may be arranged to change the effective length of the pressure lever in between the crimping steps. A supporting joint of the pressure lever is associated with the jack drive. The supporting joint has an eccentric surface corresponding to the crimping steps. The pressure lever is supported on the eccentric surface. For example, in case of realizing four crimping steps, the pin or bolt forming the supporting joint for the pressure lever may have a square and eccentrically arranged cross section. The bolt is turned between two crimping steps about 90 degrees by the jack drive such that the pressure lever is radially supported on surfaces of the square cross section of the bolt having different dimensions. After finishing the four crimping steps, the bolt is again arranged in its starting position, and it is ready for another four-step crimping process to be operated at the next work piece.

To manually change the effective length of the pressure lever between the crimping steps, there may be a stepped bolt preferably being arranged at the fixed handle. The stepped bolt is designed to be movable in the direction of its axis, and its forms a supporting joint for the pressure lever. The stepped bolt includes two cylindrical portions having different diameters, and subsequently having an effect onto the work piece during a two-step crimping process.

The pivot jaws preferably include at least two parallel plates extending symmetrically with respect to the plane of main extension of pliers. The dies are designed in the form of semi shells to be insertable into the pivot jaws. At least one semi shell is arranged with a clearance at the corresponding pivot jaw allowing for a centering movement in the direction of the separation plane of the dies. This arrangement serves to keep producing tolerances as small as possible, and to use the optimum ratio of transmission of the toggle lever drive at each crimping step. A plate design of the pliers is especially suitable for attaining small producing tolerances. The plate design also makes it possible to better introduce and distribute the pressing forces in the dies and in the semi shells, respectively. The use of semi shells allows for great exactness and easy manufacture, for example by turning on a lathe. Additionally, the roundness of the crimped work piece is improved. The clearance allowing for a centering movement in the direction of the separation area of the dies has a positive effect. There is an automatic centering movement when the work piece is crimped. The clearance also makes it possible to easily remove and to replace the semi shells. With the novel pliers, it is possible to apply great crimping forces, as they are necessary for plastically deforming the work piece. This is achieved by a one-hand operation and even in case of undesired working conditions. The short structural length and the low weight of the pliers allow for a one-hand operation. The pliers include the locking mechanism locking in at an early time such that the pliers execute a comparatively small opening stroke or loosening stroke after the first crimping step. The effective length of the pressure lever is changed during this loosening stroke and in the clearance of the locking mechanism between two teeth. The pliers are ready for the following crimping steps. It is also possible to put both hands around the approached two handles to further increase the crimping forces to plastically deform metals easily. Nevertheless, the pliers may also be operated by one hand during the last crimping step. The pliers are also handy in case of tight working conditions, and they may be opened in the region of the dies fairly wide before the first crimping step without losing the possibility of operating the pliers by one hand.

In a preferred embodiment of the pliers, both pivot jaws each include three plates, the center plate of which is arranged in the plane of main extension of the pliers. The center plate together with the two other plates being arranged symmetrically with respect to the plane of main extension of pliers allows for an introduction of force into the dies being designed as semi shells. Additionally, crimping forces are introduced into the semi shells in a spaced apart manner to advantageously have an effect along at the length of the semi shells.

The center plate of each pivot jaw may be pivotable with respect to the other plates to replace the dies. Thus, the center plate fulfills a further function. The semi shells at their other circumference include a continuous channel being centeringly engaged by the center plates.

The plates of each pivot jaw may be interconnected by an additional securing pin. Such a securing pin or bolt is not necessary for a pivotal movement. Nevertheless, it has a positive effect on the plates remaining parallel, and it prevents the plates from being twisted and tilt.

The additional securing pin is preferably designed to be removable. It may be used to remove and to replace the semi shells. Replacing the semi shells is to be understood as removing worn out dies or otherwise spoiled dies, and as replacing them by dies of the same geometry or by dies of a different geometry.

A manually operable pivot lever may be arranged at one of the pivot jaws for replacing the die. This arrangement allows for a quick replacement of the dies. The pivot lever may be arranged in the plane of main extension or spaced apart thereto.

The handles of the pliers may include slip-on plastic covers or bodies including outwardly extending protrusions. The protrusions realize sliding protection in an undesired grip region. They improve the desired grip of the handles at the right place.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
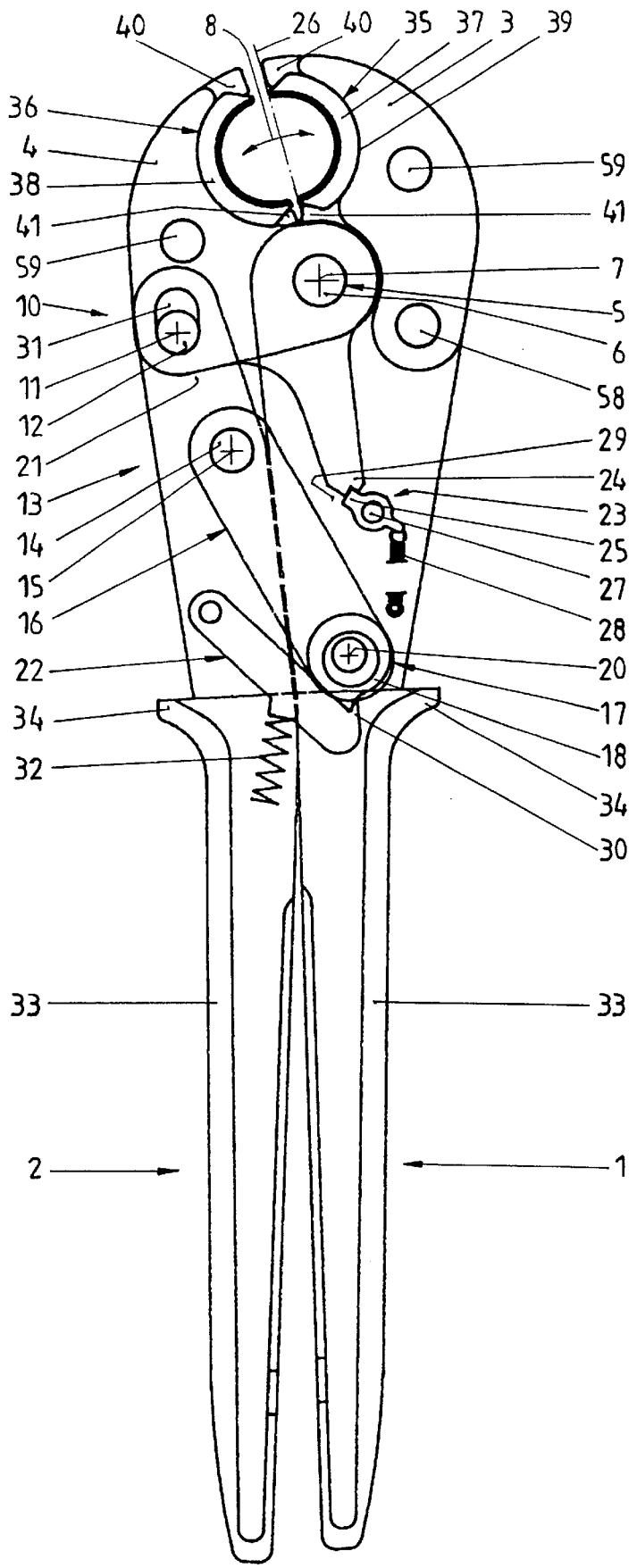
FIG. 1 is a view of a first embodiment of the pliers at the end of a first crimping step.

Referring now in greater detail to the drawings, FIG. 1 illustrates pliers including handles 1 and 2. The handle 1 is fixedly connected to a pivot jaw 3 to be commonly rotated and such that these two elements form a stationary portion of the pliers. The pivot jaw 3 and the handle 1 may also be designed as one piece. The handle 1 is also referred to as stationary handle although, for an activation of the pliers, it is only important that there is a relative movement of the handles 1 and 2 with respect to one another. In addition to the stationary pivot jaw 3, there is a movable pivot jaw 4 being pivotally connected to the stationary portion of the pliers 1, 3 by a joint 5. The stationary handle 1 may be designed as a semi shell or to have a plate design such that its legs or plates 56, 57 extend approximately symmetrically to the plane of main extension 19 of the pliers. A pin 6 extend through the legs or plates 56, 57, the movable pivot jaw 4 being designed and arranged to be pivotal with respect to the stationary pivot jaw 3 about the axis 7 of the pin 6. A crimping die 8 is located at the pivot jaws 3 and 4. The crimping die 8 may be designed to be replaceable or as one piece with the pivot jaws 3, 4. In the illustrated embodiment, the crimping die 8 is formed by two dies 35, 36 being designed in the form of semi shells 37, 38. The semi shells 37, 38 are removeably and replaceably inserted into the pivot jaws 3, 4. The axial length of the semi shells 37, 38 perpendicular to the plane of main extension 19 also forming the plane of illustration covers the length of a union stem onto which, for example, a tube is to be connectingly and sealingly crimped. Preferably, the axis 9 (FIG. 2) of the crimping die 8 is to be located close to the joint 5, meaning at a distance between the axis 7 and 9 being chosen to be as small as possible.

The movable pivot jaw 4 being associated with the movable handle 2 is enlarged in a lateral direction with respect to the stationary handle 1 to arrange a first support joint 10, the axis 11 of which being formed by a pin 12. The pin 12 engages elongated holes 31 of the movable handle 2.

A second support joint 13 is arranged at the movable handle 2, the support joint 13 being formed by a pin 14 having an axis 15. A pressure lever 16 being arranged between the handles 1 and 2 is pivotally supported by the pin 14. The other end of the pressure lever 16 is pivotally supported in a third support joint 17. The support joint 17 is formed by an eccentric pin 18. The eccentric surface of the eccentric pin 18 supports the pressure lever 16. The eccentric pin 18 is fixedly connected to the stationary handle 1. The eccentric cam is dislocated with respect to pressure lever 16 during rotation. Thus, eccentricity changes its position. The eccentric pin 18 at its circumference includes a plurality of notches to change eccentricity and the effective length of the pressure lever 16. A jack drive 22 includes a switching jack 30 being driven by a spring 32 and engaging the notches of the eccentric pin 18. The switching jack 30 and the notches are designed and arranged such that they jump over or skip in one direction and that they move the eccentric pin 18 to turn one step further according to the stroke of the switching jack 30 in the other direction. Consequently, eccentricity and thus the effective length of the pressure lever 16 are changed. The rotation always takes place during a loosening stroke, meaning when the handles 1 and 2 are being slightly opened. Thus, it takes place when the pliers are free from crimping forces. There is a number of possibilities of realizing such a loosening stroke. A first possibility is to arrange the elongated holes 31 at the plates 56, 57 forming the movable handle 2. A second possibility is to use the pitch of a tooth segment 24 of a locking mechanism 23 and to design the pitch bigger than usual. Further possibilities will be described hereinbelow. The embodiment illustrated in FIG. 1 may include four notches being located at the eccentric pin 18. Thus, three successive crimping steps are realizable. Consequently, the effective length of the pressure lever 16 is changed in three steps or stages such that the dead center (or an approximate dead center) may be used for an optimal transmission of the forces.

The effective length of the pressure lever 16 is determined by the distance between the axis 15 of the support joint 13 and the axis 20 of the eccentric pin 18. A section 21 is determined by the arrangement of the support joints 10 and 13 at the movable handle 2. The effective length of the section 21 corresponds to the distance between the axes 11 and 15. The first ratio of transmission of the effective length of the pressure lever 16 with respect to the distance between the axes 11 and 15 may be in the range of between approximately 1.6:1 and 1:1, preferably in the range of 1.4:1. The ratio of transmission is positive in the sense of producing a great crimping force.

The second ratio of transmission is determined by the distance between the axes 7 and 11 with respect to the distance between the axes 9 and 7. The second ratio of transmission is chosen to be as great as possible. Preferably, it is in the range of between 1.6:1 and 2.0:1, especially it is approximately 1.8:1. The second ratio of transmission realizes the main transmission, and it is used in all pressure steps. Since the first ratio of transmission is positive and more than 1 and the two ratios of transmission multiply, the pliers are especially suitable for applying especially great crimping forces.

The design and arrangement of the elements, especially of the crimping die 8, the joint 5 and the support joints 10, 13 and 17 as well as the pressure lever 16, is chosen such that the handles 1 and 2 in the opened position of the pliers (FIG. 6) may be grasped by the fingers of one hand of the user to be moved in a direction towards the closing position of the pliers. Plastic covers 33 are arranged on the handles 1 and 2. The plastic covers 33 include outwardly protruding protrusions 34. The plastic covers 33 in the region of the protrusions 34 are located at a distance of maximally about 110 mm in the opened position (FIG. 6) such that the handles 1 and 2 may be held by the fingers of one hand to operate the pliers with one hand.

Figure 6:
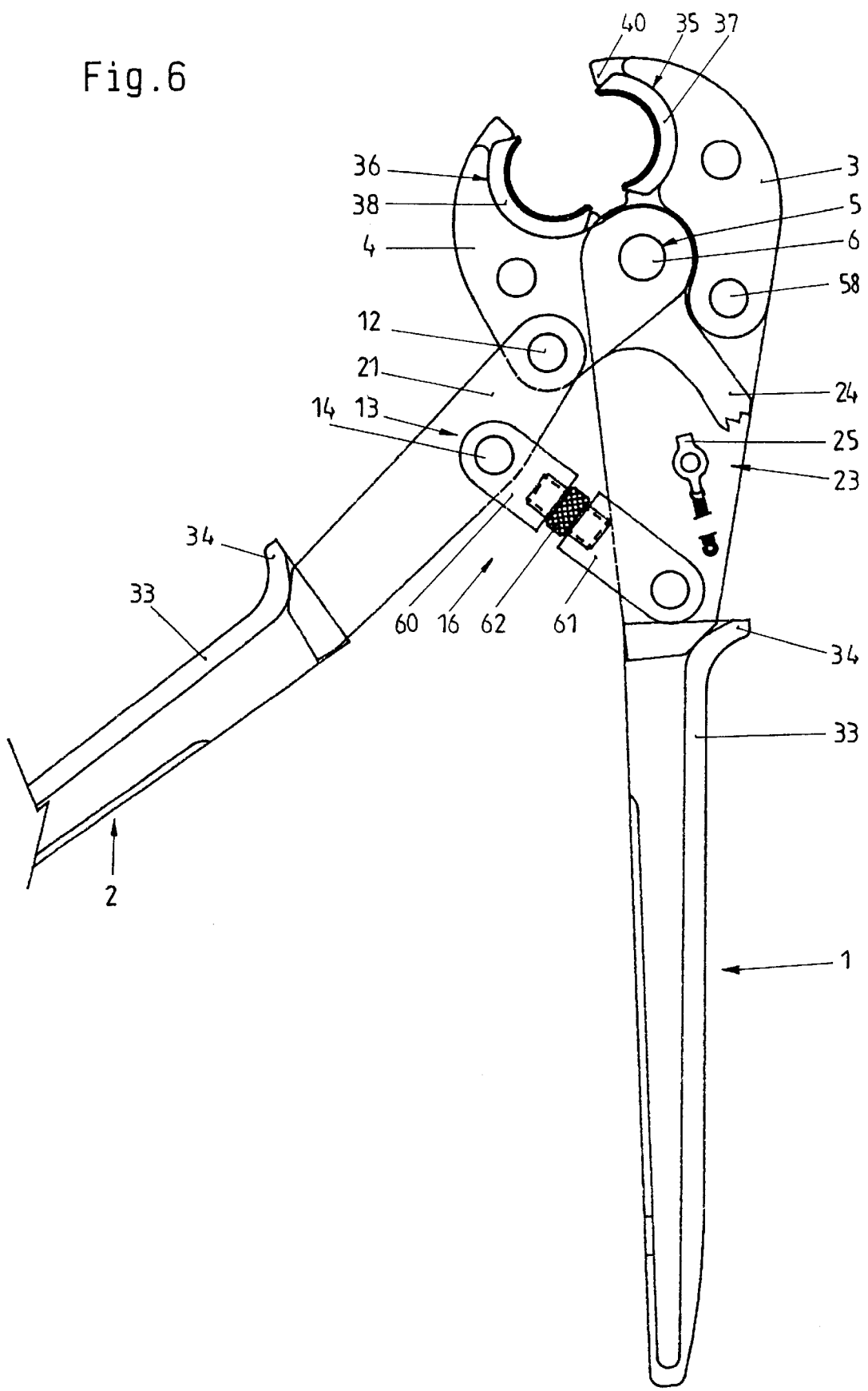
FIG. 6 is a view of a forth embodiment of the pliers in the opened position.

The pliers include a locking mechanism 23 including a tooth segment 24 and a jack 25. The tooth segment 24 only includes a limited number of teeth having a relatively great pitch. Generally, two teeth are sufficient. The tooth segment 24 is supported on the pin 6 of the joint 5 and on the movable pivot jaw 4, respectively, and connected thereto, respectively. The locking mechanism 23 is operatively arranged between the movable pivot jaw 4 and the stationary handle 1. Thus, after having reached the first crimping step, the pliers may only be moved into the loose position, but not into the opened position (FIG. 6). The crimping die may slightly open when the pliers are moved from the closed position at the end of the first crimping step into the loose position. The dies may then get free from the crimping force.

Reaching the loose position of the handles 1, 2 is important to be capable of changing the effective length of the pressure lever 16 in this intermediate position. When the effective length of the pressure lever 16 has been changed, the work piece is further crimped, meaning the next crimping step takes place.

Figure 2:
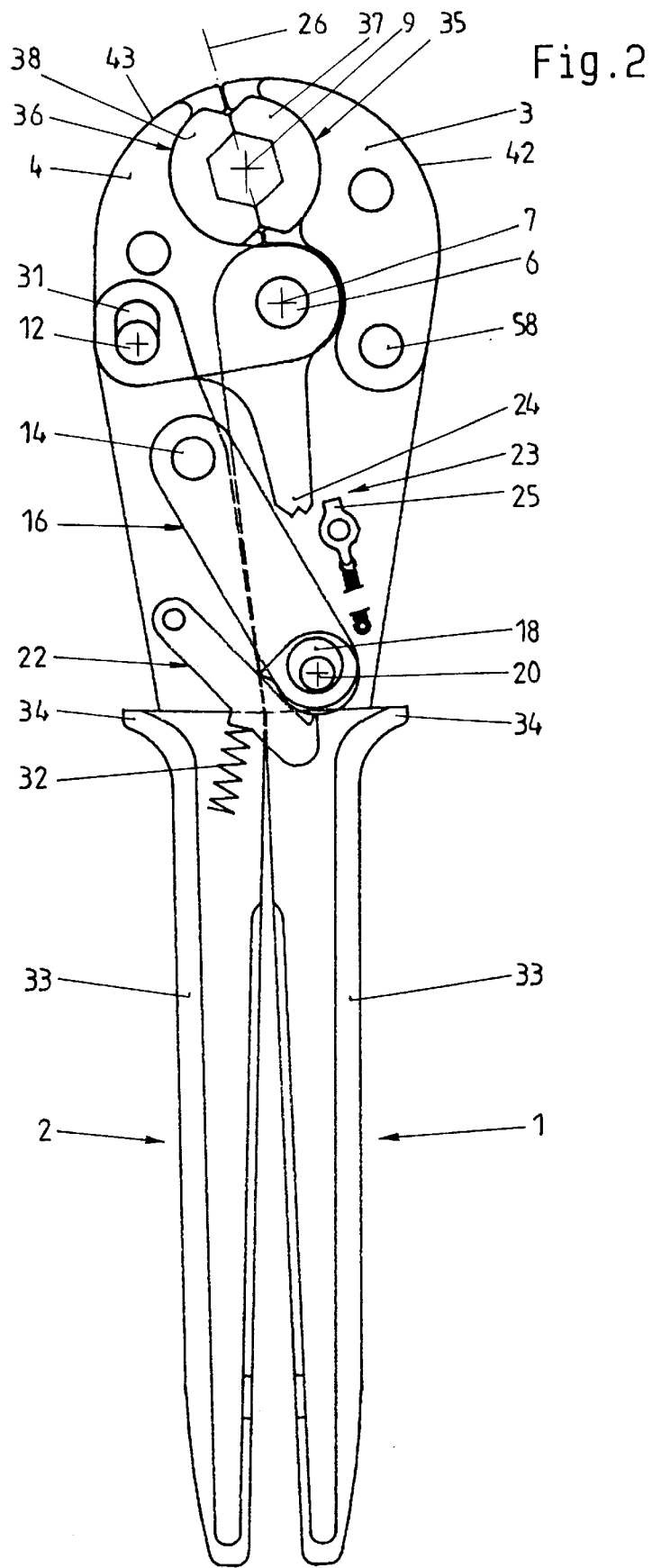
FIG. 2 is a view of a second embodiment of the pliers in the closed position.

It is to be understood that the tooth segment 24 could also be designed as one piece with the movable pivot jaw 4. The jack 25 is pivotally suspended on a pivot pin 27, and it is subjected by a draw spring 28 into the illustrated position with respect to the pressure lever 16. A free portion 29 for inverting the sense of rotation of the jack 25 is located close to the teeth of the tooth segment 24 and in a direction towards the pressure lever 16. It is to be seen that the locking mechanism 23 locks in at the beginning of the closing movement during a change from the opened position (FIG. 6) into the closed position (FIG. 2). Consequently, even if the user does not hold the pliers any longer, the handles 1 and 2 cannot return into their opened position according to FIG. 6. The essential first part of this closing movement takes place without substantial counter forces. The crimping die 8 surrounds the work piece. The actual crimping process of the first crimping step takes place in the last part of the closing movement. The necessary crimping force is built up during the actual crimping process. The crimping force reproducibly attains is its greatest value in the end position (closed position) as illustrated in FIG. 2. The number of realized crimping steps may vary between at least 2 to approximately 5.

The pliers include dies 35 and 36 being designed as separate elements being rotationally symmetric and being inserted into the pivot jaws 3 and 4. The dies 35 and 36 together form the crimping die 8, and they are cylindrically limited in their outer region. They are separated in a separation plane 26, and they may have different inner designs depending on their purpose of use. According to FIG. 1, the semi shells 37 and 38 also have an inner design being rotationally symmetric, and they include channels and protrusions, for example to crimp the mounting of an armature. FIG. 2 illustrates the crimping die 8 having a hexagonal design. The semi shells 37 and 38 are inserted into the pivot jaws 3 and 4, respectively, with a clearance 39. The clearance 39 allows for a relative displacement of the one semi shell 37 with respect to the other semi shell 38 in the direction of the separation plane 26. With this design, during the crimping process, the semi shells 37 and 38 may adapt to one another to be centered at the work piece. This is true during all crimping steps. This arrangement has a positive effect of the roundness of the crimped work piece. Protrusions 40, 41 are arranged at the pivot jaws 3 and 4 to prevent the semi shells 37 and 38 from falling out off the pivot jaws 3 and 4. The clearance 39 also covers these protrusions 40, 41. The pivot jaws 3 and 4 in their outer regions include roundings 42, 43 to simplify the use of the pliers even in case of tight or narrow mounting conditions. The roundings 42, 43 may also be designed as plane surfaces being located at an angle of approximately 90 degrees. Consequently, the pliers may also be used in case of tight mounting conditions, for example when a tube is to be crimped onto a nipple in a water tank of a toilet.

The closing position after finishing the second or the last crimping stage (end position) illustrated in FIG. 2 shows that the crimping die 8 is closed. The exemplary embodiments of FIGS. 1 and 2 show an automatic adjustment of the effective length of the pressure lever 16. For this purpose, the pliers only have to be actuated by one hand according to the number of crimping stages. This means to press the handles 1, 2 towards one another, and to pass through the corresponding loose position between the single crimping stages. The pliers may include an opening spring (not illustrated) for this purpose.

Figure 3:
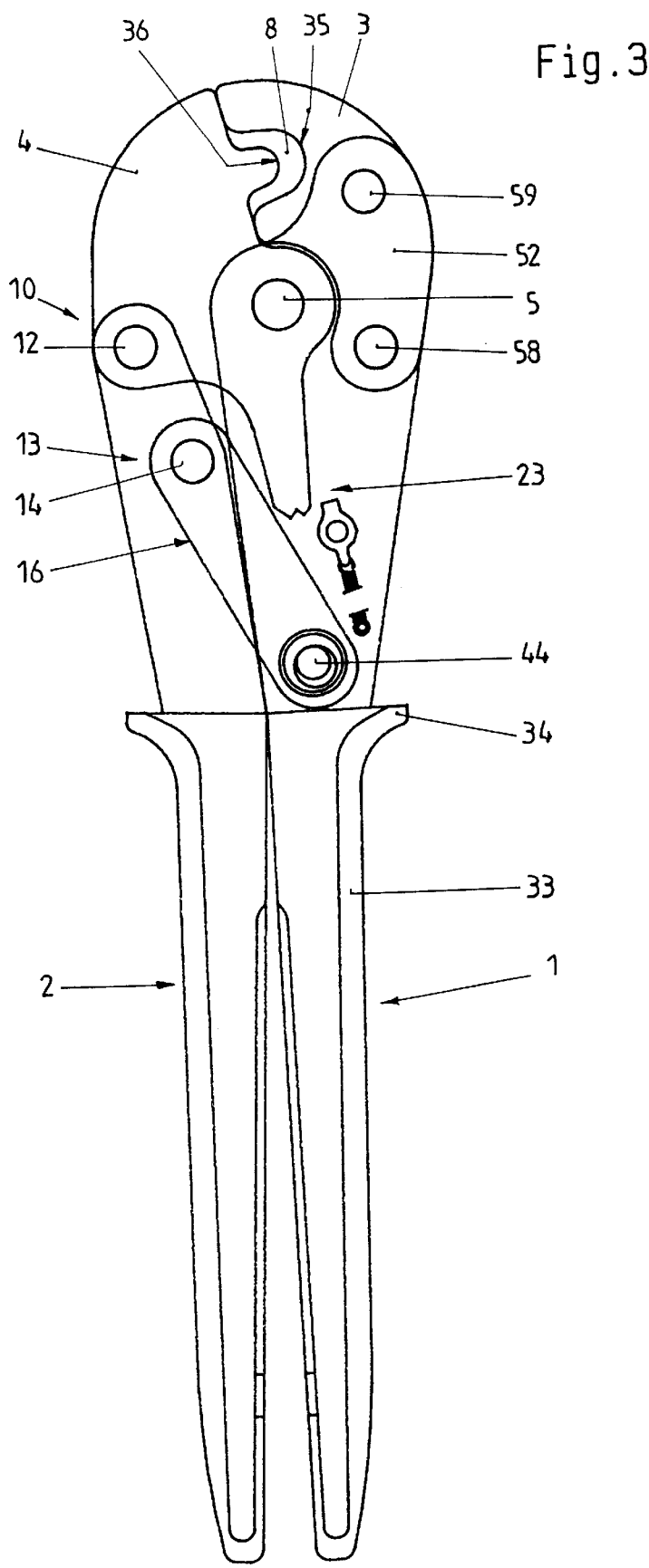
FIG. 3 is a view of a third embodiment of the pliers in the closed position.
Figure 5:
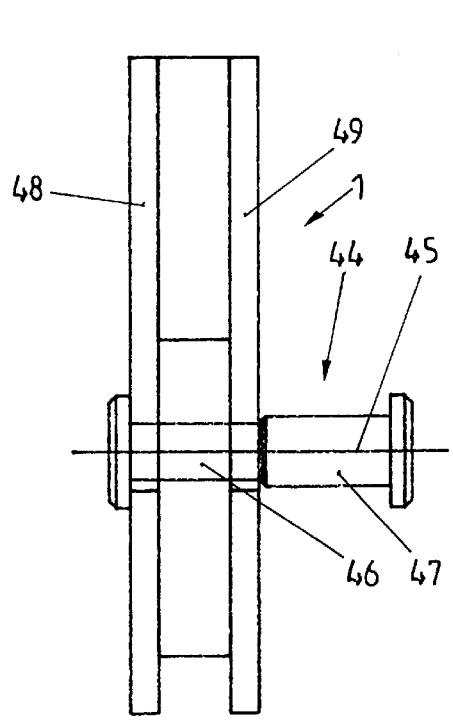
FIG. 5 is a side view of a portion of the pliers according to FIG. 3.

The embodiment of FIGS. 3 and 5 shows a possibility of a manual adjustment for a change of the effective length of the pressure lever 16. A stepped pin 44 replaces the eccentric in 18. The stepped pin 44 is movably supported in the fixed handle 1 within the direction of its axis 45, meaning perpendicular to the plane of main extension 19. In case of two crimping stages, the stepped bolt 44 includes two cylindrical portions 46 and 47 having different diameters. The pressure lever 16 is subsequently supported on the portions 46 and 47. The clearance existing between the two teeth of the tooth segment 24 of the locking mechanism 23 is used to reach the loose position between the two crimping stages. It is to be seen from FIG. 5 that the pliers also have a plate design in the region of the fixed handle 1, and that they include two plates 48 and 49. It is to be seen from FIG. 3 that the pivot jaws 3 and 4 are each designed as one piece together with the dies 35 and 36 forming the crimping die 8. Again, and arbor is crimped.

Figure 4:
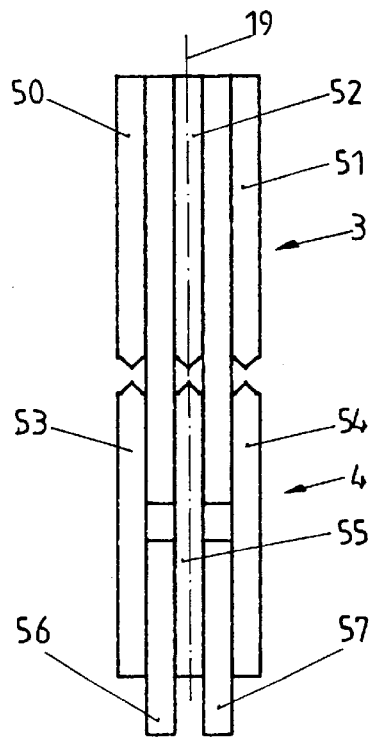
FIG. 4 is a front view of the pliers according to FIGS. 1 to 3 having a plate design.

FIG. 4 illustrates the plate design in the region of the pliers had. The pivot jaw 3 is formed by two plates 50 and 51 being arranged symmetrically with respect to the plane of main extension 19 of the pliers and by a center plate 52. The pivot jaw 4 is formed by two plates 53 and 54 being arranged symmetrically with respect to the plane of main extension 19 of the pliers and by a center plate 55. The movable handle 2 includes two plates 56 and 57. That center plates 52 and 55 do not only serve to transmit part of the crimping force, but also to axially determine the dies 35 and 36 and semi shells 37 and 38, respectively, with respect to the pivot jaws 3 and 4. For this reason, the semi shells 37 and 38 include continuous channels (not illustrated) engaging the center plates 52 and 55. The center plates 52 and 55 are pivotally supported on pins 58 and 12, respectively, and replaceable securing pins 59 fix them. After removing the securing pins 59, the center plates 52 and 55 may be pivoted, and the semi shells 37, 38 may be replaced. It is also possible to arrange pivot levers instead of the center plates 52, 55, the pivot levers being pivotal against the force of a spring to allow for a quick replacement of the semi shells 37, 38.

The embodiment of the pliers according to FIG. 6 shows a possibility of adjusting the effective length of the pressure lever 16 by hand. The pressure lever 16 includes two lever portions 60 and 61 being interconnected by a rod 62. The rod 62 engages the lever portions 60 and 61 by a left-handed/right-handed thread, and it may be turned with respect to the lever portions 60 and 61. Preferably, there is a label indicating, for example, three crimping stages I, II and III to make it easier to correctly adjust the three crimping stages one after the other. The tooth segment 24 includes three teeth. There is a clearance located between the teeth allowing for the possibility of attaining the corresponding loose position without allowing for the possibility of reaching the opened position of the pliers (FIG. 6).

Figure 7:
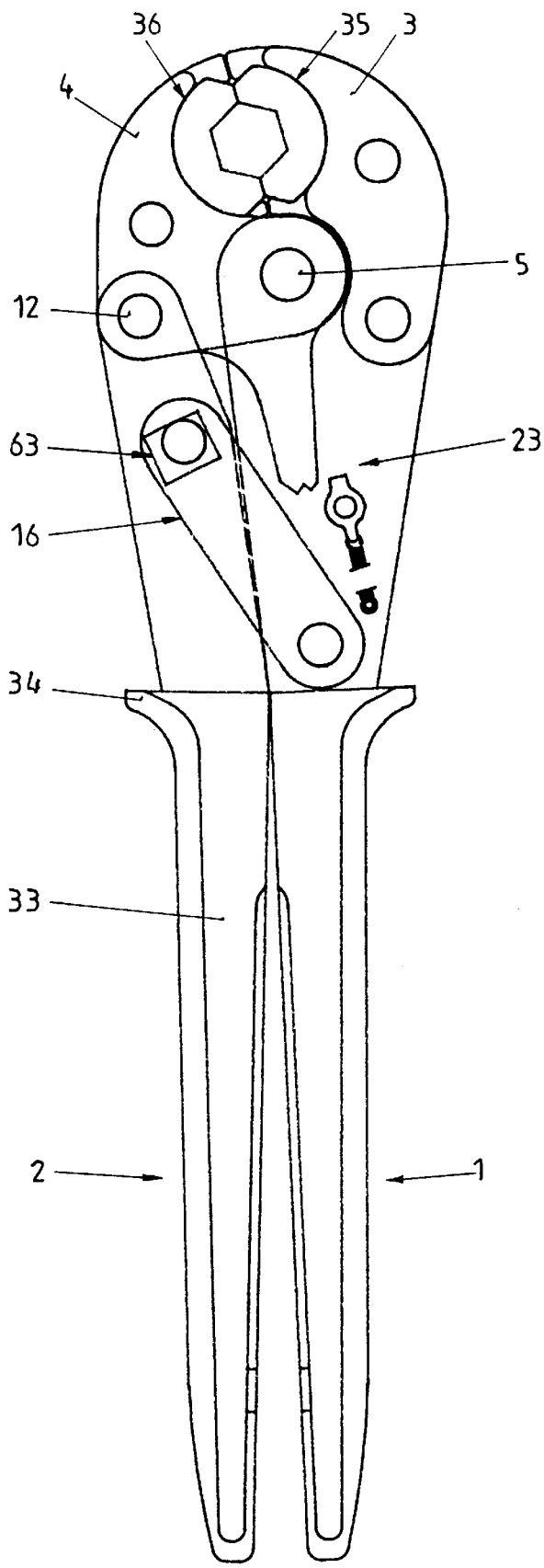
FIG. 7 is a view of another embodiment of the pliers at the end of the last crimping step.

FIG. 7 schematically illustrates another possibility of automatically changing the crimping stages. The pressure lever 16 cooperates with a rotatable square bolt 63 including four eccentric surface portions to be supported in the four crimping stages. After each crimping stage, the square bolt 63 is rotated by a jack drive (not illustrated) similar to the jack drive 22 of FIG. 1 about 90 degrees. The end position is reached after the fourth crimping stage. At this time, the locking mechanism 23 opens for the first time. The square bolt 63 is automatically located in its beginning position as it is required to conduct the first crimping stage.

Figure 8:
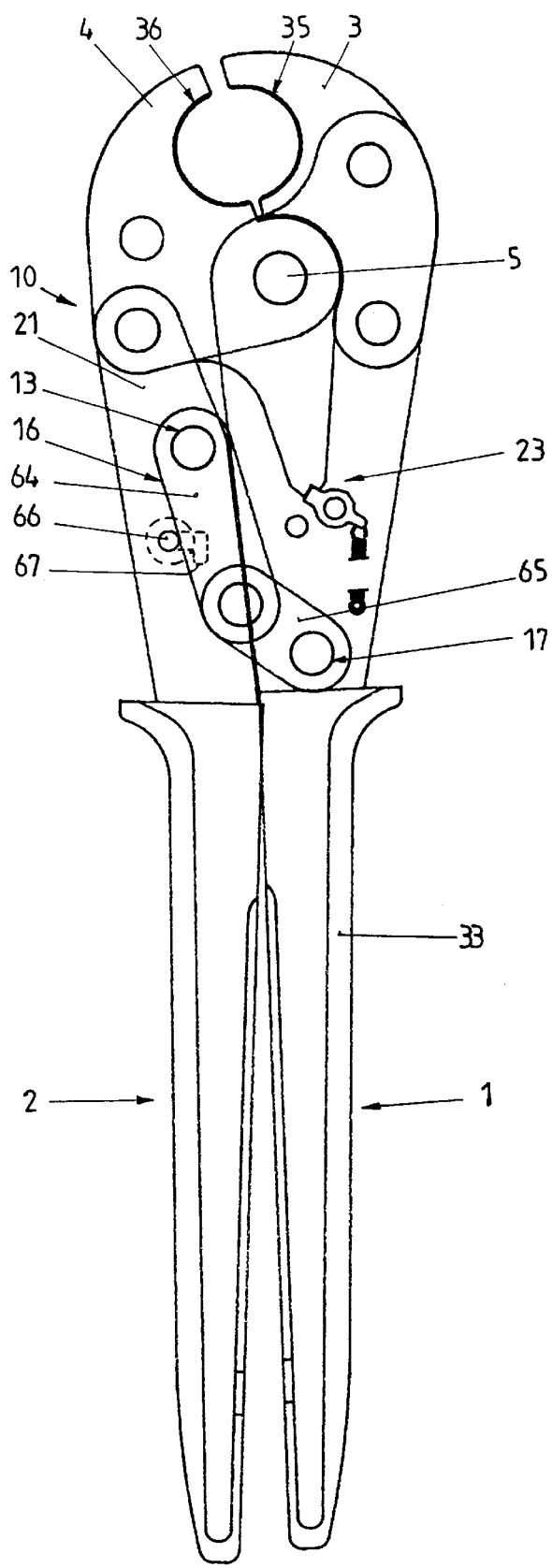
FIG. 8 is a view of another embodiment of the pliers at the end of a first crimping step.

FIG. 8 illustrates pliers including two crimping stages and a manual adjustment. The pressure lever 16 is designed in the form of two joint levers to 64 and 65 being pivotally interconnected and being supported by a bolt 66. The bolt 66 is movable within an angled elongated hole 67. The bolt 66 is illustrated in the position in which it is located during the first crimping stage. The loose position between the two crimping stages is attained due to the fact that the locking mechanism 23 at the end of the first crimping stage locks the two crimping dies 3 and 4, but nevertheless, the two joint levers 64 and 65 may be moved into their extended position by pivoting the movable handle 2 about the supporting joint 10. Thus, the bolt 66 is also free from forces, and it is movable. The bolt 66 is manually pushed towards the other end of the angled elongated hole 67, and it is interlocked. Then, the second crimping stage follows during which greater crimping forces are applied, and during which the work piece is deformed to attain its final shape.

The Many variations and modifications may be made to the preferred embodiments of the invention without departing substantially from the spirit and principles of the invention. All such modifications and variations are intended to be included herein within the scope of the present invention, as defined by the following claims.

We claim:

1. Pliers for crimping work pieces, comprising:
   a first stationary handle;
   a second movable handle, said first and second handles being designed and arranged to be movable with respect to one another and to be operable by one hand;
   a first pivot jaw being connected to said first stationary handle to form a stationary pliers portion;
   a second pivot jaw being connected to said second movable handle;
   a common joint pivotally connecting said stationary pliers portion and said second pivot jaw;
   a first die being arranged at said first pivot jaw;
   a second die being arranged at said second pivot jaw, said first die and second die together forming a crimping die and being designed and arranged to contact one another in a closed position of said pliers in a separation plane;
   a locking mechanism being operatively arranged between said stationary handle and said second pivot jaw and being designed and arranged to attain a defined closed position of said first and second die in the separation plane; and
   a toggle lever drive including a plurality of supporting joints and a pressure lever operatively connecting said first and second handles, said pressure lever being supported by said plurality of supporting joints,
   said toggle lever drive being designed and arranged to change the effective length of said pressure lever between a plurality of crimping steps in at least one loose position of said pliers to crimp the work piece in the plurality of crimping steps with a plurality of different effective lengths of said pressure lever, the loose position being a position in which said pliers are substantially free from crimping forces without allowing said pliers to reach an opened position.

2. The pliers of claim 1, wherein said toggle lever drive is designed and arranged to manually change the effective length of said pressure lever between said crimping steps.

3. The pliers of claim 1, further comprising:
   a jack drive being designed and arranged to change the effective length of said pressure lever between said crimping steps; and a supporting joint being associated with said jack drive, said supporting joint having an eccentric surface corresponding to said crimping steps and said pressure lever being supported on said eccentric surface.

4. The pliers of claim 2, further comprising:

a jack drive being designed and arranged to change the effective length of said pressure lever between said crimping steps; and a supporting joint being associated with said jack drive, said supporting joint having an eccentric surface corresponding to said crimping steps and said pressure lever being supported on said eccentric surface.

5. The pliers of claim 3, further comprising a stepped pin being designed and arranged to change the effective length of said pressure lever between said crimping steps, said stepped pin being arranged at said fixed handle, being movable in the direction of its axis and forming a supporting joint for said pressure lever.

6. The pliers of claim 1, wherein each of said pivot jaws includes at least two parallel plates extending symmetrically with respect to the plane of main extension of said pliers;

said dies are designed as semi shells to be insertable into said pivot jaws; and at least one of said semi shells is arranged at said corresponding pivot jaw with a clearance to be movable in the separation plane in the sense of a centering adjustment of said semi shells.

7. The pliers of claim 1, wherein each of said pivot jaws includes three plates, a center plate of which being located parallel to and within a plane of main extension of said pliers, the plane of main extension extending perpendicular to the separation plane and parallel to said pivot jaws.

8. The pliers of claim 6, wherein each of said pivot jaws includes three plates, a center plate of which being located parallel to and within a plane of main extension of said pliers, the plane of main extension extending perpendicular to the separation plane and parallel to said pivot jaws.

9. The pliers of claim 7, wherein said center plate is designed and arranged to be pivotal with respect to said other plates to replace said dies.

10. The pliers of claim 8, wherein said center plate is designed and arranged to be pivotal with respect to said other plates to replace said dies.

11. The pliers of claim 1, further comprising a manually operable pivot lever being connected to said die and being designed and arranged to allow for a replacement of said die.

12. The pliers of claim 2, further comprising a manually operable pivot lever being connected to said die and being designed and arranged to allow for a replacement of said die.

13. The pliers of claim 1, wherein each of said handles includes a plastic cover including an outwardly extending protrusion.

14. The pliers of claim 1, wherein the work pieces are selected from a group consisting of fittings, tubes and cable lugs.

15. The pliers of claim 1, wherein said toggle lever drive is designed and arranged to change the effective length of said pressure lever between less than ten crimping steps to crimp the work piece.

16. The pliers of claim 1, wherein said toggle lever drive is designed and arranged to change the effective length of said pressure lever between 2 and approximately 5 crimping steps to crimp the work piece.

17. The pliers of claim 1, wherein said toggle lever drive is designed and arranged to change the effective length of said pressure lever in three crimping steps to crimp the work piece.

18. Pliers for crimping work pieces, comprising:

a stationary handle;

a movable handle movable with respect to said stationary handle;

a stationary jaw rigidly mounted to said stationary handle;

a pivot jaw pivotally mounted to said movable handle;

a common joint pivotally connecting said stationary handle and said pivot jaw;

a first die mounted in said stationary jaw;

a second die mounted in said pivot jaw and arranged for movement with said pivot jaw toward said first die for crimping a work piece therebetween;

a toggle lever drive including a pressure lever operatively connecting said stationary handle and said movable handle; and said toggle lever drive including a jack drive engaging said pressure lever and being designed and arranged to automatically change the effective length of said pressure lever between crimping steps in response to said movable handle moving away from said stationary handle.

19. The pliers of claim 18, wherein said pressure lever has opposed ends, with one end connected to said stationary handle and the other end connected to said movable handle, and said jack drive having one end mounted to one of said handles and another end engaging said pressure lever at the other of said handles.

* * * * *